June 21, 1927. 1,633,277
E. A. RYAN ET AL
TIRE CHAIN
Original Filed Feb. 23, 1924
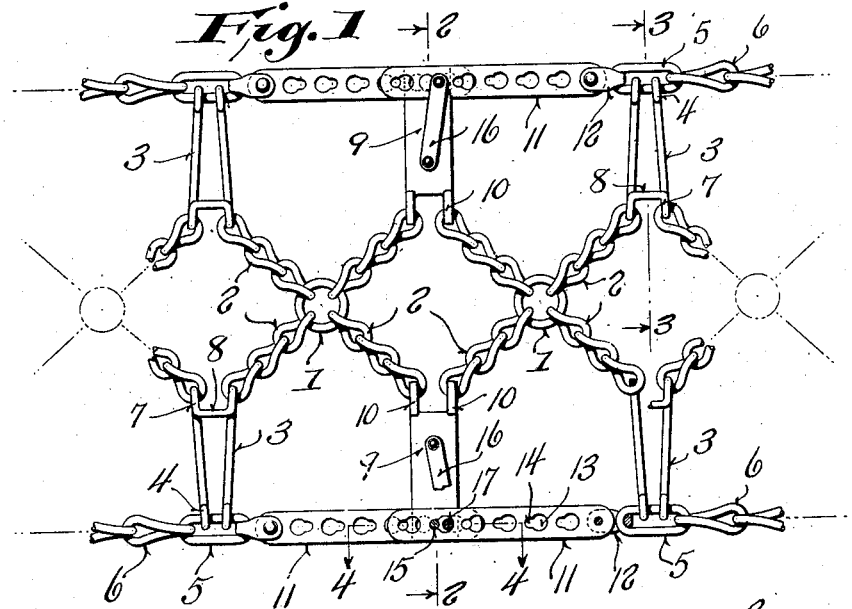
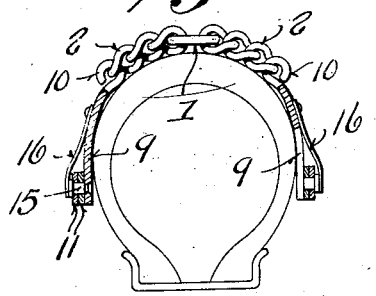
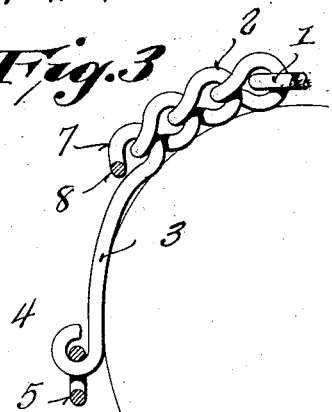
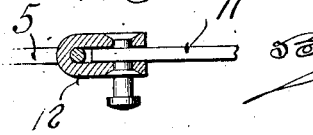
Inventors:
Edward A. Ryan
Frederick F. Marksman
Witness:
R. E. Weber Patented June 21, 1927.

1,633,277

UNITED STATES PATENT OFFICE.

EDWARD A. RYAN AND FREDERICK L. MARKSMAN, OF MILWAUKEE, WISCONSIN.

TIRE CHAIN.

Application filed February 23, 1924, Serial No. 694,727. Renewed March 18, 1927.

This invention relates to tire chains for vehicles.

Objects of this invention are to provide a tire chain which will protect the vehicle against either forward, angular or lateral skidding, in which some portion of the chain is in contact with the ground at all times, in which jar is avoided as the chains are gradually presented beneath the tire due to the angular arrangement of the individual elements of each unit, in which the units may be removed and replaced when worn in an easy manner, in which the entire chain may be most readily tightened by tightening the side chains, and in which this tightening of the side chains automatically tightens the individual portions of the chains passing over the tire, thus insuring the firm engagement of the chain and the tire at all times.

It has been found that the extreme hardness of the chains is needed primarily at the contacting portion thereof and that, therefore, the side chains are made, in the practice of this invention, with less brittleness and with greater strength, thus combining the wear resisting properties of the contacting portions with the qualities of strength at the portions under greatest tension.

Further objects are to provide a tire chain in which the units making up the contacting portions of the chain have each of their several parts separately welded and preferably case hardened to a certain depth, thus leaving a strong unhardened core.

An embodiment of the invention is shown in the accompanying drawings, in which:—

Figure 1 is a view of the chain laid out flat.

Figure 2 is a transverse sectional view on the line 2—2 of the chain showing it in position upon a tire.

Figure 3 is an enlarged detail on the line 3—3 of Figure 1.

Figure 4 is an enlarged fragmentary detail on the line 4—4 of Figure 1.

Figure 5 is an enlarged detail section taken at one of the pivot pins for one of the straps 11.

The chain comprises distinct units forming wear resisting portions, and these units each comprise a centrally positioned ring 1 from which a plurality of chains 2 radiate, as shown in Figure 1. The links and the ring are separately welded so as to form a complete unit without an open joint therein. Successive units are joined by means of hook shaped members having arms 3 provided with hooks 4 adapted to engage links 5 of the side chains 6, such links 5 being preferably elongated and untwisted, as illustrated in Figure 1. Obviously, the links 6 may be straight or twisted as found most expedient. The inner ends of these hooks or connectors are turned inwardly to provide hooks 7 joined by a connecting portion 8, as shown in Figures 1 and 3.

The hooks or connectors and the side chains are preferably formed of malleable material to permit bending thereof and insertion of new wearing units when desired. The wearing units consisting of the rings 1 and the chains 2 are preferably case hardened to provide the requisite wear resisting characteristics, although it is preferable to leave a core in the rings and chains which is unhardened to provide additional strength. The ends of the chain are joined by means of plates 9 which are provided with hooks 10 adapted to engage the terminal chains 2 of the tire chain, and to thus complete the continuity of the chain. The side chains are joined to adjusting straps 11 preferably by means of clevices 12 pivoted to such adjusting straps as illustrated in Figure 1. These adjusting straps are provided with a plurality of key hole apertures having an enlarged portion 13 and a restricted portion 14.

A pin 15 is carried by each of the plates 9 and is adapted to be passed through superimposed apertures in the overlapping strips 11, as illustrated, and to be seated in the reduced or restricted portions 14 of such apertures. In order to prevent the uncoupling of the adjusting straps, a spring finger 16 is pivotally mounted upon each of the plates and carried at its free end an inwardly directed pin 17. After the pin 15 has been positioned, as shown in the drawings, particularly in Figure 4, it is merely necessary to swing the spring finger 16 into position and to allow the pin 17 to snap into the enlarged portion 13 of the uppermost or outermost apertures, thus securely retaining the pin 15 in the restricted portion of the apertures. It is preferable to provide the pin 15 with a head, as shown, so that it may not inadvertently slip out of the apertures. It is, of course, understood that the head of the pin 15 is of a size to permit its free insertion through the enlarged portions 13 of the apertures. It is prevented, as stated, from again inadvertently becoming positioned in these enlarged portions 13 of the apertures, by means of the pins 17.

It will be seen that the chains 2 of the road engaging units cooperate with the side chains to form in effect a lazy tong mechanism. In other words, when the side chains are tightened by means of a suitable tool, they necessarily assume the position of a circle of a lesser diameter, and consequently draw upon the connectors, and thus tend to shorten the entire length of the chain. Thus the tension of the side chains is distributed throughout the entire structure of the composite tire chain.

It will be seen, therefore, that a tire chain has been provided which may be maintained in secure engagement with the tire by means of the adjustable side chains, and which is so constructed that the individual units composing the contacting portion of the chain, may be most readily interchanged or removed.

It will further be seen that an extremely simple type of device has been provided for locking the side chains in their adjusted position, and preventing inadvertent detachment thereof.

Although the invention has been described in considerable detail, it is to be understood that the invention may be variously embodied and is, therefore, to be limited only as claimed.

As shown in Figure 5, the end links of the chain are preferably joined to the straps 11 by means of loop members 12. The joint between the loop members 12 and the straps 11 preferably includes an elongated pivot pin, as clearly shown in Figure 5, of which there are four per chain, one in each loop member. The pivot pins on each side are intended to cooperate with two portions of a contracting tool, which is used to tighten such chain.

We claim:

1. A tire chain comprising a pair of side chains, a pair of apertured straps joined to the ends of each of said side chains and adapted to be arranged in overlapping position, a member having a pin adapted to be passed through aligning apertures of said straps, means for retaining said pin in position, and a plurality of anti-skid units interposed between said side chains, one set of units being connected to said member and holding said member in position relatively to said side chains.

2. A connector for chains comprising a pair of straps each connected to the end of a chain, said straps having key hole apertures each consisting of an enlarged portion and a restricted portion, a pair of plates having pins adapted to be seated within aligning restricted portions of the apertures when said straps are arranged in overlapping relation, a spring finger carried by each of said plates, and provided with a pin at its free end adapted to be positioned in the enlarged portions of said key hole slots on either side of said pins to retain said first mentioned pins in position.

In testimony that we claim the foregoing we have hereunto set our hands at Milwaukee, in the county of Milwaukee and State of Wisconsin.

WARD A. RYAN.
FRED L. MARKSMAN.